United States Patent
Kawashima et al.

[11] Patent Number: 6,057,881
[45] Date of Patent: May 2, 2000

[54] APPARATUS AND METHOD FOR CALIBRATING A VIDEO DISPLAY ABOUT A MULTIPLE OF SENSOR POSITIONS BY ILLUMINATING ONE CALIBRATION SENSOR AT A TIME

[75] Inventors: Toshiyuki Kawashima, N. Huntingdon, Pa.; Tatsuya Watanabe, Tokyo, Japan

[73] Assignees: Sony Corporation, Tokyo, Japan; Sony Electronics, Inc., Park Ridge, N.J.

[21] Appl. No.: 08/869,127

[22] Filed: Jun. 4, 1997

[51] Int. Cl.[7] .................................................. H04N 17/00
[52] U.S. Cl. ........................ 348/190; 348/807; 348/181
[58] Field of Search .................... 348/180, 181, 348/189, 190, 806, 807, 745; 315/368.11

[56] References Cited

U.S. PATENT DOCUMENTS

| | | | |
|---|---|---|---|
| 4,857,998 | 8/1989 | Tsujihara et al. | 348/190 |
| 4,999,703 | 3/1991 | Henderson | 348/190 |

*Primary Examiner*—Victor R. Kostak
*Attorney, Agent, or Firm*—Frommer Lawrence & Haug, LLP.; William S. Frommer

[57] ABSTRACT

A system and method for performing convergence calibration, wherein the test patterns generated during the convergence procedure illuminate only one convergence sensor at a time. Since only one sensor is illuminated at a time, there is no need to switch among sensors in order to obtain sensor readings, and the sensors can share an A/D converter without such switching. Therefore, in a convergence apparatus according to the invention two or more sensor couplings are simply coupled to a shared coupling which is, in turn, coupled to the input of a shared A/D converter. Thus, no switching circuitry is required, it is not necessary to perform a sensor/sensor coupling association routine, and there is no need for a convergence subsystem memory.

9 Claims, 15 Drawing Sheets

NO PATTERN

NO PATTERN

NO PATTERN

APPARATUS AND METHOD FOR CALIBRATING A VIDEO DISPLAY ABOUT A MULTIPLE OF SENSOR POSITIONS BY ILLUMINATING ONE CALIBRATION SENSOR AT A TIME

FIELD OF THE INVENTION

This invention relates to video displays, and more particularly to performing convergence calibration in video displays.

BACKGROUND OF THE INVENTION

It is well known in the field of video displays to generate pictures on a screen by combining multiple beams of light. For example, a typical rear projection color television set includes three cathode ray tubes (CRTs), each CRT processing one of the primary colors—red, blue or green. By combining the three monochromatic beams the set can produce full color television pictures. However, in order for the set to produce accurate pictures, proper alignment of the beams must be maintained. That is, the CRTs must be calibrated so that their beams are focused at the same point on the screen. Accordingly, the calibration of the CRTs is often referred to as a convergence procedure, and beam alignment is often referred to as convergence. For a more detailed discussion of convergence, references are made to FIGS. 1 and 2.

FIG. 1 is a plan view of a model rear projection television set. The components of the set are housed within a cabinet 10, and they include: a CRT 12, a lens 14, a mirror 16, and a screen 18. The model set includes three CRTs and multiple lenses for each CRT, although for clarity, only a single CRT and a single lens are shown in the figure. The light from the CRT passes through the lens and illuminates the mirror which, in turn, reflects the light onto the screen for observation by the viewer.

FIG. 2 illustrates the relationship between the three CRTs of the model set. As can be seen from the figure, CRTs 12, 20 and 22 are matched respectively with lenses 14, 24 and 26, and the CRTs are aligned so that their beams converge. To maintain the alignment of the beams one or more photosensors are typically provided at the periphery of the screen. An example is shown in FIG. 3.

FIG. 3 includes an arrangement of four photosensors, 28, 30, 32 and 34. The sensors are located inside the cabinet and are not visible to the viewer. Also, the sensors are located behind a screen frame 36, which is not part of the display screen, and therefore the sensors do not interfere with images displayed on the screen. Nevertheless, the sensors are located within the area that can be scanned by the CRTs.

FIG. 4A shows the relationship between sensors 28–34, screen 18, and a CRT scannable area 38 as seen from the viewer's perspective. For clarity the screen frame is not shown. When performing the convergence procedure, test patterns are produced within the scannable area and detected by the sensors. More specifically, each CRT produces two test patterns, a wide pattern and a narrow pattern. Thus, to complete the convergence procedure the following patterns are produced: red-wide, red-narrow, blue-wide, blue-narrow, green-wide, and green-narrow. These patterns and their function are discussed in more detail in connection with FIGS. 4B–4E.

FIGS. 4B–4E show illustrative test patterns as generated by any one of the primary color CRTs. In the interest of brevity, FIGS. 4B–4E are discussed in the context of the red CRT only. However, it should be noted that the discussion is equally applicable to the other primary color CRTs.

FIGS. 4B and 4C show test patterns that are generated when the red CRT is properly aligned with the center of the screen. FIG. 4B shows a red-wide pattern 40 and its relative position to the scannable area, screen, and sensors. As can be seen from the figure, the red-wide pattern is made up of four illuminated areas that define a rectangle (indicated by the dotted line). Each illuminated area overlaps the entirety of one sensor. The center point of the scannable area is denoted by "o" and the center of the rectangle defined by the red-wide pattern is denoted by "x". Since the red CRT is properly aligned, the o and x coincide.

FIG. 4C shows a red-narrow pattern 42. As in the case of the wide pattern, since the CRT is properly aligned, the x and o coincide. However, in the case of the narrow pattern, only one half of each of the sensors are overlapped by the pattern. The relative sensor overlap in the wide pattern and narrow pattern cases is key to maintaining alignment of the CRT, and will be discussed in more detail below. First, FIGS. 4D and 4E are referred to in order to show the effect of misalignment on the test patterns.

FIG. 4D shows a red-wide pattern 44 that is generated when the red CRT is misaligned by an amount $\delta$ in the horizontal direction (left of center from the viewer's perspective). Since the pattern is sufficiently wide, it still overlaps the entirety of each of the sensors. FIG. 4E shows red-narrow pattern 46 that is generated when the red CRT is misaligned by an amount $\delta$ in the horizontal direction (left of center from the viewer's perspective). In FIG. 4E, since the pattern is narrow, the sensor overlap is changed relative to the overlap shown in FIG. 4C. As will be described below, this change in overlap is used to determine the amount of misalignment, which is, in turn, used as an error signal for the purpose of correcting the misalignment.

The amount of beam misalignment at a position defined by a given sensor is determined by observing that sensor's readings when exposed to the wide and narrow patterns. The observed readings are used to form a ratio which is then compared to a desired ratio, the desired ratio being the ratio obtained for the sensor under no misalignment conditions. The difference between the measured ratio and the desired ratio indicates the amount of beam misalignment. Described below is an illustrative misalignment determination as performed by sensor 28.

FIGS. 5A–5E show the relationship between sensor 28 and various test patterns. FIG. 5A depicts the sensor in a no pattern condition. FIGS. 5B–5E show the sensor as illuminated by the patterns of FIGS. 4B–4E, respectively. To measure the misalignment, the light incident on sensor 28 is measured for each of the wide and narrow cases and a ratio of the two is computed. The value of the ratio in the no misalignment case is the desired ratio, and it is obtained in the following manner: the sensor reading under no pattern conditions (noise) is subtracted from the sensor reading under wide-pattern/no-misalignment conditions (FIG. 5B) to generate a first difference; the sensor reading under no pattern conditions is subtracted from the sensor reading under narrow-pattern/no-misalignment conditions (FIG. 5C) to generate a second difference; and the second difference is divided by the first difference. To obtain the value of the ratio for the depicted misalignment: the sensor reading under no pattern conditions (noise) is subtracted from the sensor reading under wide-pattern/$\delta$-misalignment conditions (FIG. 5D) to generate a first difference; the sensor reading under no pattern conditions is subtracted from the sensor reading under narrow-pattern/δ-misalignment conditions (FIG. 5E) to generate a second difference; and the second difference is divided by the first difference. The difference between the two ratios thus obtained indicates the amount of misalignment. The red CRT is then adjusted until the ratios match. A similar procedure is executed for the other primary beams and in this way convergence is achieved.

In order to achieve precise convergence, the ratio calculations mentioned above must be performed with a high degree of accuracy. For this purpose the calculations are typically performed digitally. However, to perform the calculations digitally the sensor readings must first be passed through an A/D converter. Thus, the sensor subsystem generally includes one or more A/D converters, which are shared by the sensors. To illustrate, the portion of the sensor subsystem associated with sensors 30 and 34 is shown in FIG. 6.

FIG. 6 shows how prior convergence subsystems implement sharing of an A/D converter 49. As can be seen from the figure, sensors 30 and 32 occupy their positions at the edge of the screen 18 and are coupled to a switching circuit 50 via couplings 52 and 54, respectively. The switching circuit includes two single-pole/single-throw switches, 56 and 58, for the purpose selectively coupling the sensors to the A/D converter. Thus, to couple sensor 30 to the A/D converter switch 56 closes, and to couple sensor 32 to the A/D converter switch 58 closes.

In prior video display systems, the switching circuit is used to simplify construction of the systems. In typical prior system configurations, the sensor couplings, e.g. 52 and 54, each have a first end connected to a sensor and a second end that runs to a common area within the set, e.g. a multi-pin connector 55, where the second end is connected to the switching circuit. In order for the switching circuit to intelligently select among the sensors, it must know which sensor each of the second ends is coupled to. One way to provide this information to the switching circuit is through careful observation during construction of the display. For example, upon construction care may be taken to assure that the second end of coupling 54 (sensor 32) is coupled to a first pin of a multi-pin connector; and that the second end of coupling 52 (sensor 30) is coupled to a second pin of a multi-pin connector. In this manner, each sensor is associated with a connector pin. Since the sensor pin assignments are predetermined at the time of construction, the assignments may be designed into the switching circuit and the switching circuit can then intelligently choose among the sensors when performing convergence testing.

However, there is a second prior method for determining the sensor/coupling associations. In the second method, it is not necessary to carefully observe the couplings during construction. In the case of the second ends being connected to a multi-pin connector, for example, it is not necessary to know which sensor is associated with each pin. Instead, a sensor/sensor coupling association routine is performed after construction.

In the sensor/sensor coupling association routine of prior systems a series of test patterns are generated, each pattern illuminating one sensor, and no two patterns illuminating the same sensor. For each pattern, the switches in the switching circuit are sequentially closed and the output of the A/D converter is monitored, the switches being closed one at a time, with no two switches being closed at the same time. When a switch is closed and it does not correspond to the coupling for the illuminated sensor, there is only a noise level output at the A/D converter. However, when a switch is closed and it does correspond to the coupling for the illuminated sensor the output rises significantly above the noise level. In this manner the switching circuit can determine coupling/sensor relationships and store a record of the relationships in a convergence subsystem memory (not shown). Of course, in order for this method to work the sensor positions must be predetermined so that the system knows where to generate the required test patterns. Furthermore, the switching circuit must include switching control circuitry (not shown) to perform such functions as recognizing which sensor is being illuminated by each test pattern and positioning switches 56 and 58 accordingly.

FIG. 7 illustrates how the sensor/sensor coupling association routine is performed in the convergence subsystem of FIG. 6. As can be seen from FIG. 7, a pattern for determining a sensor connection 60 is generated for the purpose of determining the coupling associated with sensor 32. Once the pattern is generated, switches 56 and 58 begin to sequentially close. When switch 56 closes, only noise is observed at the output of the A/D converter. In contrast, when switch 58 closes (as shown), the output of the A/D converter jumps above the noise level. Thus, by knowing which sensor has been illuminated and monitoring the output of the A/D converter, the system determines that the coupling connected to switch 56 is the coupling corresponding to sensor 32. Following determination of the sensor/sensor coupling pairings, the system may initiate convergence testing.

FIG. 8 illustrates how convergence testing is carried out in accordance with the prior convergence patterns and subsystems that have been described above. The figure includes an exemplary test pattern (namely wide pattern 44) for the purpose of discussing procedures applicable to all the prior convergence patterns. As can be seen from the figure, the test pattern illuminates both of sensors 30 and 32 at the same time. Thus, in order to obtain independent sensor readings at the output of the shared A/D converter 49, it is necessary to switch between the sensors. The necessary switching is provided through switching circuit 50. More specifically, to obtain a wide pattern reading for sensor 52, switch 56 is closed while switch 58 is open. Conversely, to obtain a wide pattern reading for sensor 54, switch 58 is closed while switch 56 is open. This process is repeated during exposure to a narrow pattern, such as pattern 46, and thus the system acquires the sensor data necessary to perform the convergence calculations.

OBJECTS AND SUMMARY OF THE INVENTION

It is an object of the present invention to provide a simplified convergence apparatus and a simplified convergence method that will allow for elimination of the sensor/sensor coupling association routine.

It is a further object of the present invention to provide a simplified convergence apparatus and a simplified convergence method that will allow for elimination of the convergence subsystem memory and elimination of the convergence subsystem switching circuit, including attendant control circuitry.

Accordingly, the present invention provides a method for performing convergence calibration wherein the test patterns generated during the convergence procedure illuminate only one convergence sensor. Since only one sensor is illuminated at a time, there is no need to switch among sensors in order to obtain independent sensor readings, and the sensors can share an A/D converter without the need for such switching. Therefore, in a convergence apparatus according to the invention two or more sensor couplings are simply coupled to a shared coupling which is, in turn, coupled to the input of a shared A/D converter. Thus, no switching circuitry is required, it is not necessary to perform a sensor/sensor coupling association routine, and there is no need for a convergence subsystem memory.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 1:
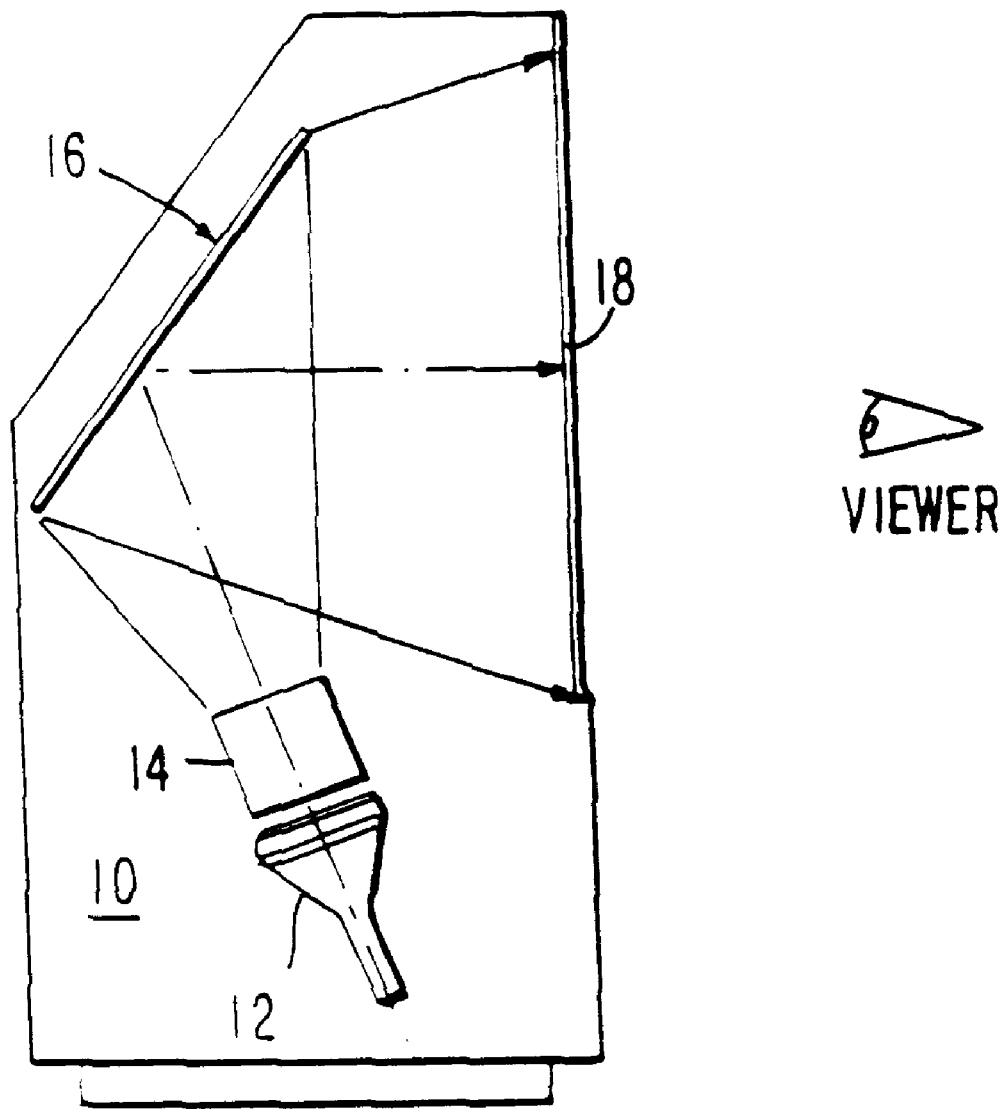
FIG. 1 is a plan view of a typical rear projection television set.
Figure 2:
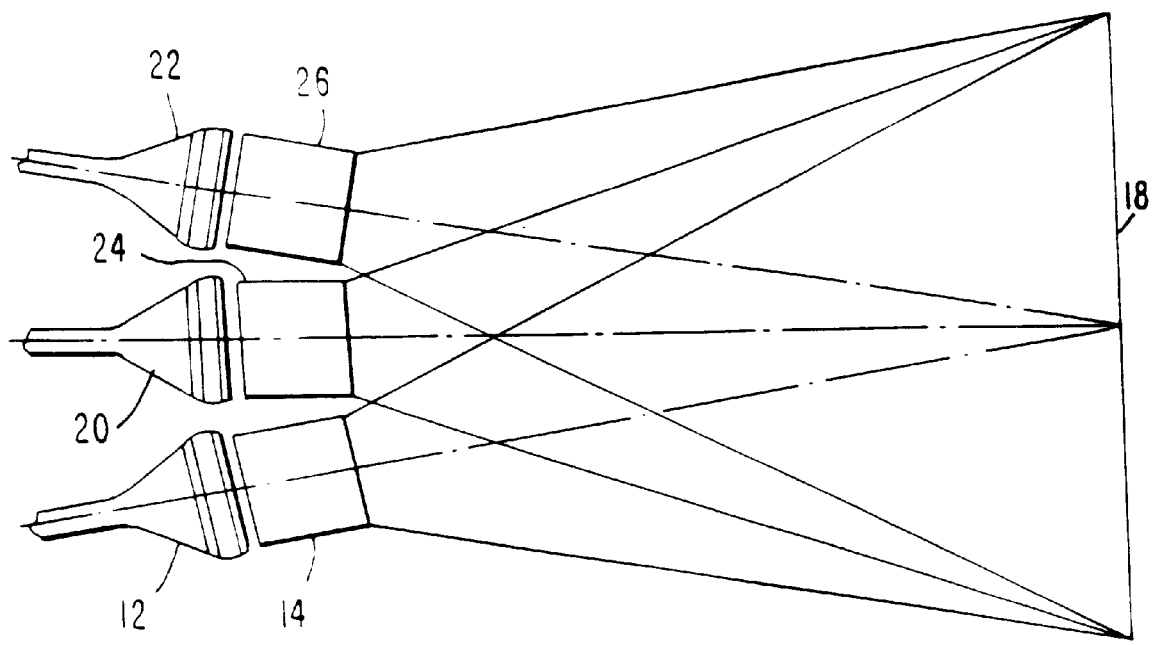
FIG. 2 illustrates the relationship between the three CRTs of the FIG. 1 set.
Figure 3:
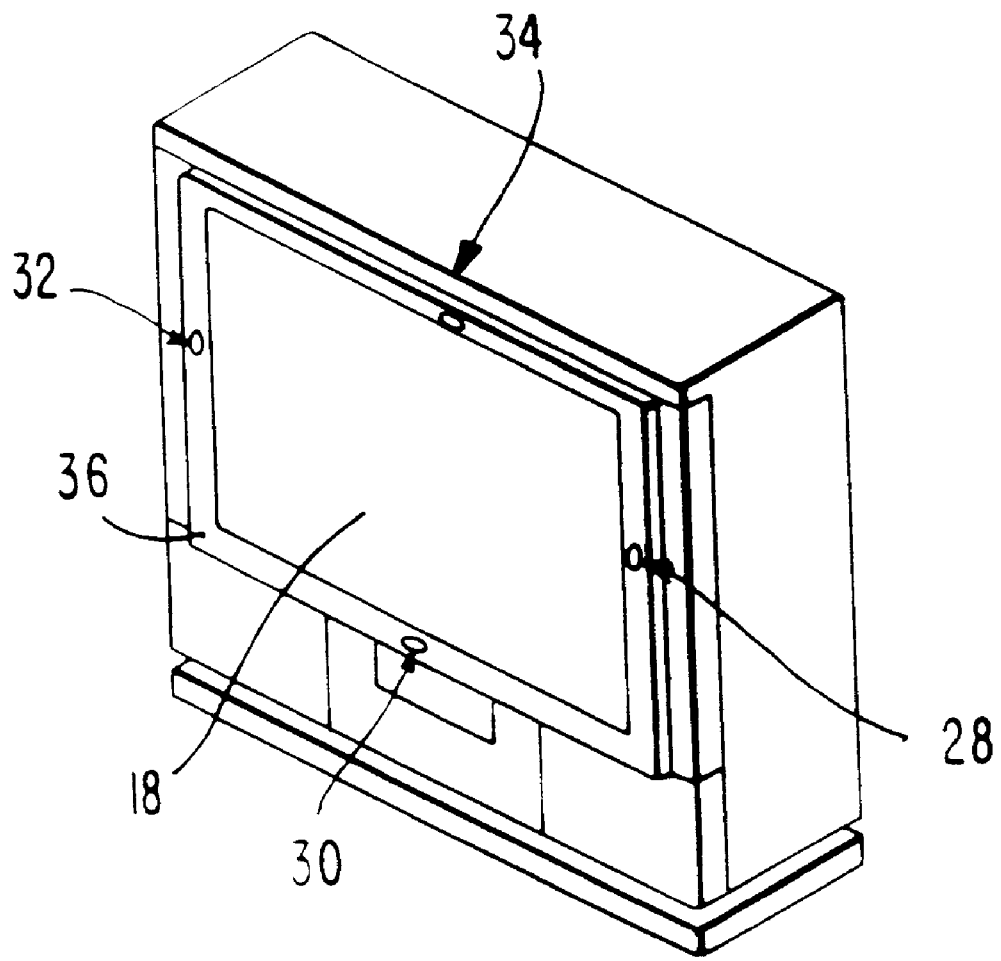
FIG. 3 shows how photosensors are typically arranged around a screen for the purpose of maintaining beam convergence.
Figure 4A:
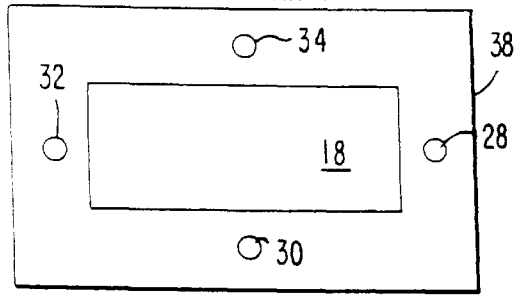
FIG. 4A shows the typical relationship between a plurality of convergence sensors, a display screen, and a CRT scannable area.
Figure 4B:
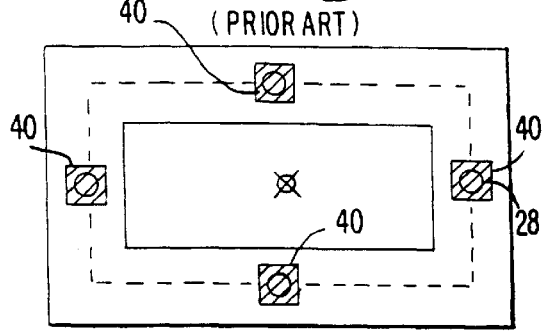
FIGS. 4B–4E show the typical relationship between the sensors, the display screen, the scannable area, and several test patterns.
Figure 4C:
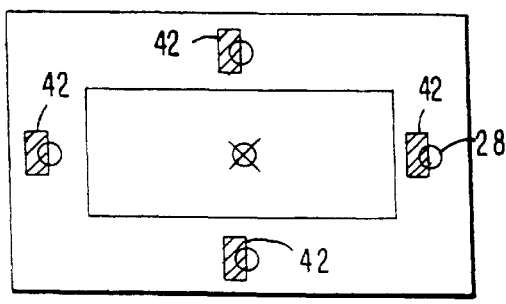
Figure 4D:
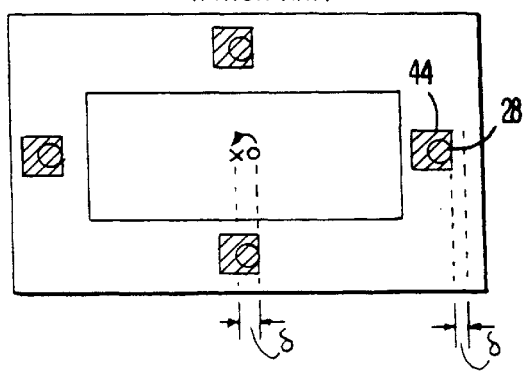
Figure 4E:
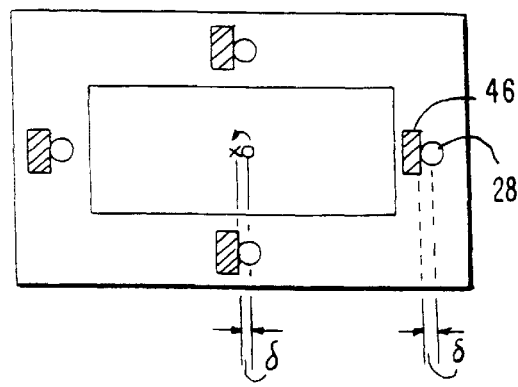
Figure 5A:
FIG. 5A is a representation of an unilluminated sensor.
Figure 5B:
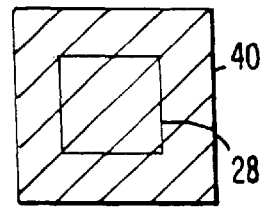
FIGS. 5B–5E are representations of the sensor of FIG. 5A as illuminated by the test patterns of FIGS. 4B–4E, respectively.
Figure 5C:
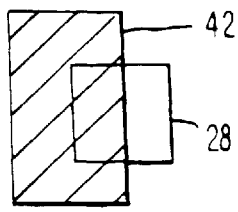
Figure 5D:
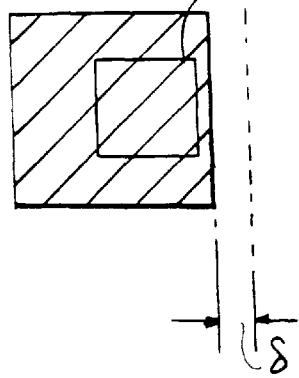
Figure 5E:
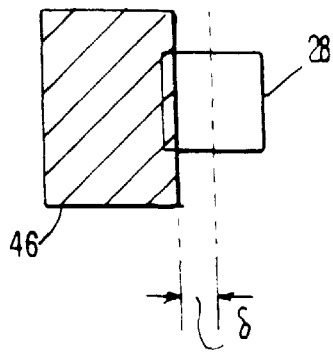
Figure 6:
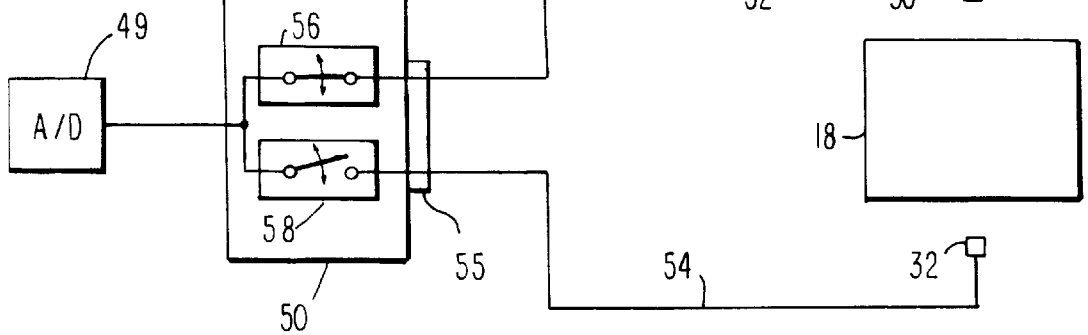
FIG. 6 shows how prior convergence sensor subsystems implement sharing of an A/D converter.
Figure 7:
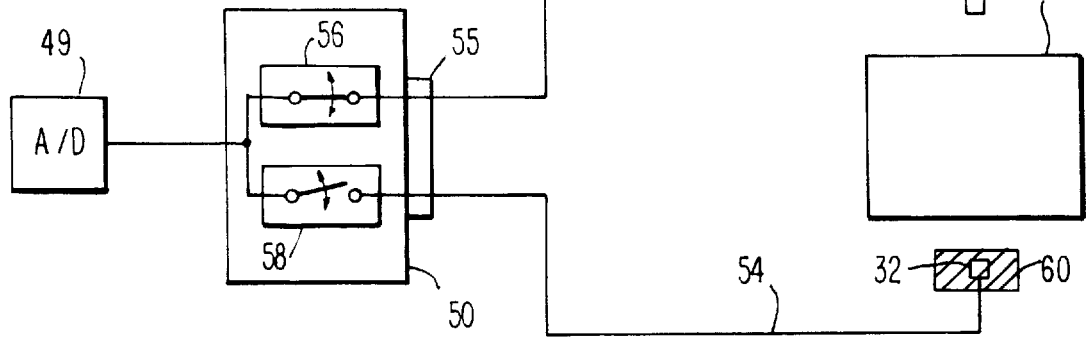
FIG. 7 illustrates how a sensor/sensor coupling association routine is performed in the convergence sensor subsystem of FIG. 6.
Figure 8:
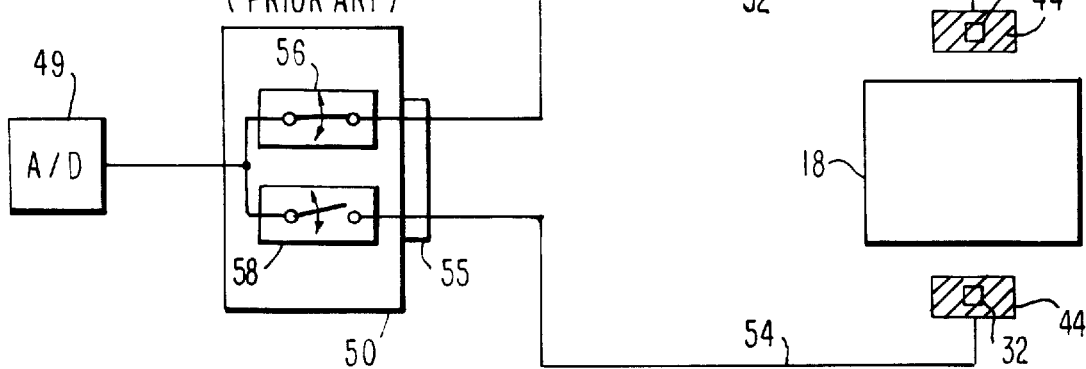
FIG. 8 illustrates how convergence testing is typically carried out in the convergence sensor subsystem of FIG. 6.
Figure 9:
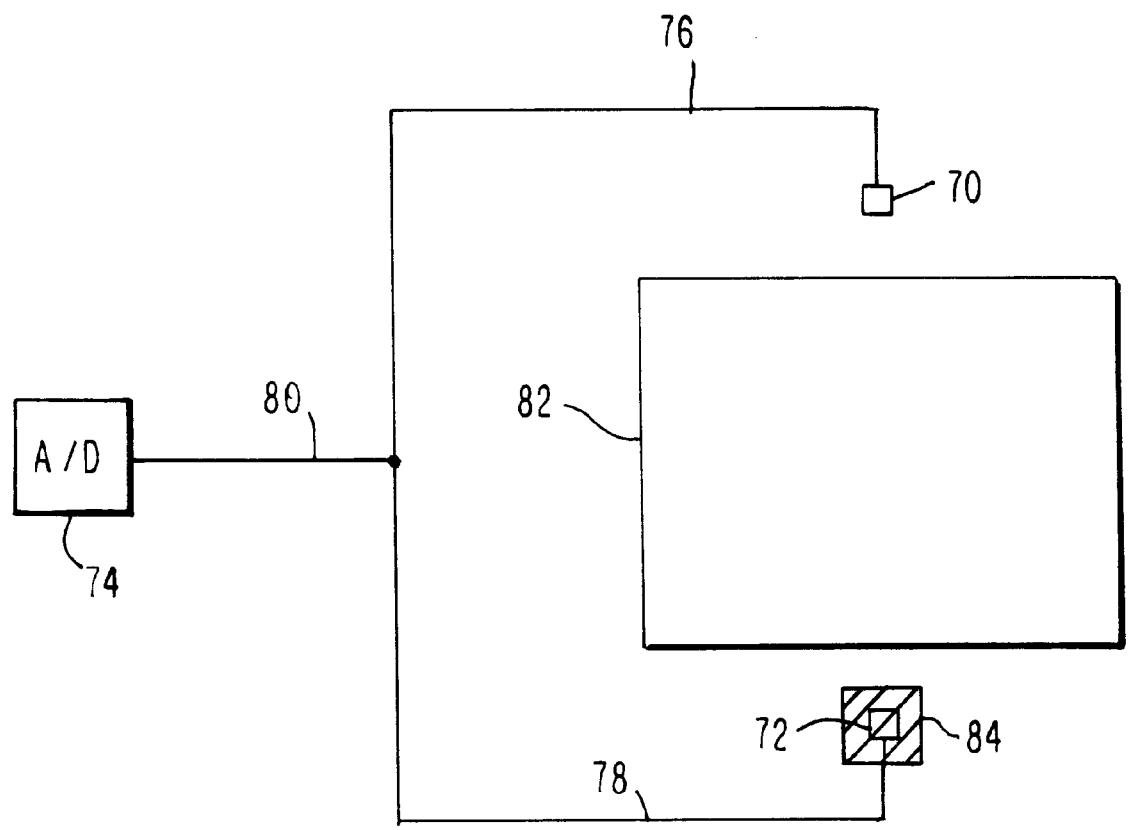
FIG. 9 shows a convergence subsystem in accordance with the invention.

FIG. 9 shows a convergence subsystem in accordance with the present invention. As can be seen from the figure, the subsystem includes two convergence sensors, 70 and 72, and an A/D converter 74. The sensors are coupled to the A/D converter through couplings 76, 78 and 80. A video display screen 82 is also shown in the figure for the purpose of illustrating the relative positions of the sensors. It should be noted that although only two sensors are shown, embodiments including more than two sensors are possible. It should be further noted that coupling 80 is not essential and that it may be eliminated by coupling the sensors directly to the A/D converter.

A convergence test pattern 84 is also shown in FIG. 9 for the purpose of illustrating convergence testing about the location defined by sensor 72. Since the pattern illuminates only a single sensor, the input of the A/D converter includes only the signal generated by sensor 72 (neglecting noise from sensor 70). To obtain an independent reading from sensor 70, sensor 70 is illuminated with a similar pattern but at a different time. Thus, no two sensors are illuminated at the same time and there is no need for a switching circuit to selectively couple the sensors to the A/D converter. Of course, in order to perform convergence testing in this manner, the sensor positions must be predetermined so that the system knows where to generate the required test patterns and so that the system knows which sensor is being illuminated by each pattern. A more detailed description of convergence testing according to the present invention is provided below.

Figure 10:
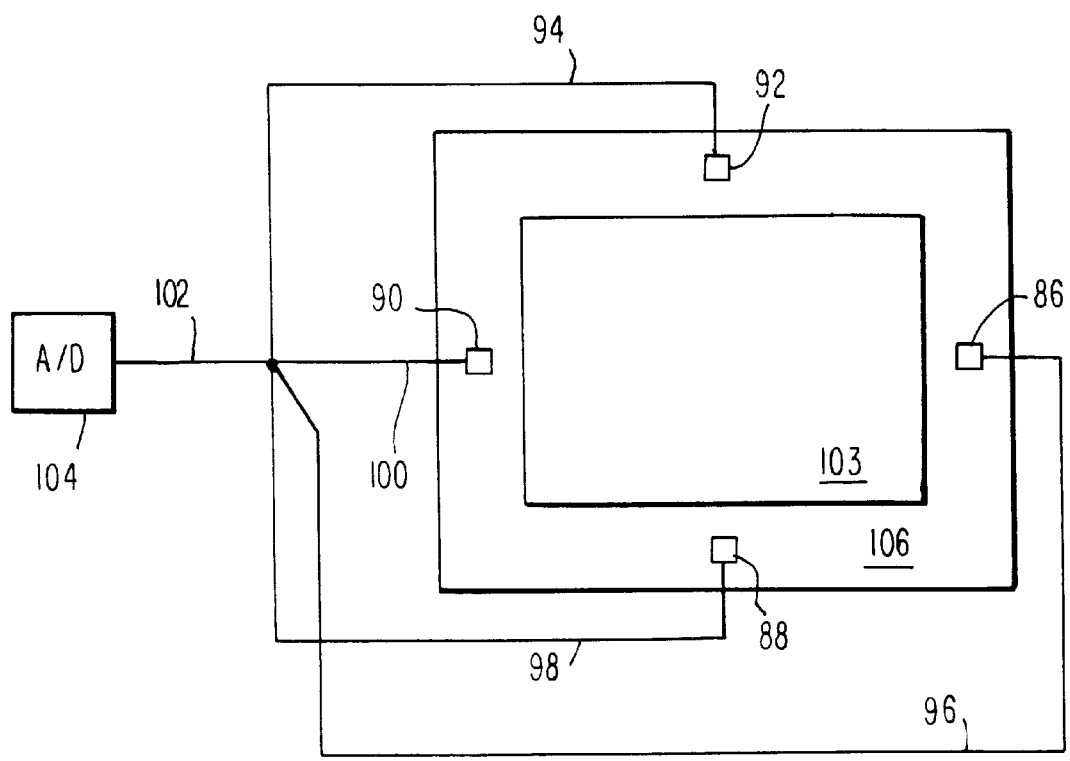
FIG. 10, shows a four sensor convergence subsystem in accordance with the invention.

Referring to FIG. 10, there is shown a four sensor convergence subsystem according to the present invention. The figure includes: sensors 86, 88, 90 and 92, couplings 94, 96, 98, 100 and 102; A/D converter 104; and screen 103. Also shown is a scannable area 106 of the display's CRTs. FIGS. 11A–11D show how sensor 86 of FIG. 10 is illuminated by various test patterns according to one embodiment of the present invention.

For purposes of showing the relative positions of the test patterns, each of FIGS. 11A–11D include the screen 103, the scannable area 106, and the sensors 86, 88, 90 and 92. Also, in each figure, an "o" indicates the center of the screen and an "x" indicates the alignment of the display's CRTs relative to the center of the screen. It should be noted that although the patterns depicted in the figures are generated by one of the system's CRTs, all of the system's CRTs are capable of generating such patterns and the discussion concerning the patterns applies to all the CRTs in the system.

Figure 11A:
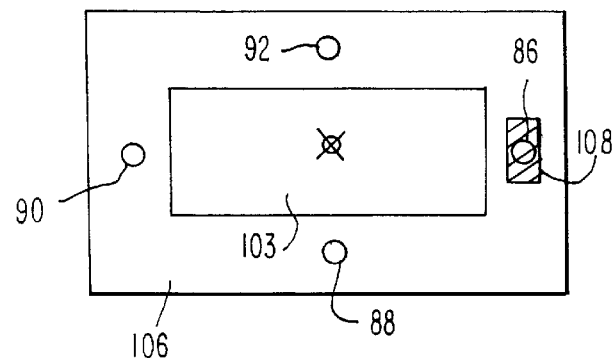
FIGS. 11A–11D show exemplary test patterns that may be used to perform convergence calibration according to a first embodiment of the invention.

FIG. 11A shows a wide pattern 108 and its relative position to the scannable area, screen, and sensor. As can be seen from the figure, the x and the o coincide, indicating that the beam is properly aligned. It can also be seen that the wide pattern illuminates only sensor 86, overlapping the sensor entirely of sensor 86.

Figure 11B:
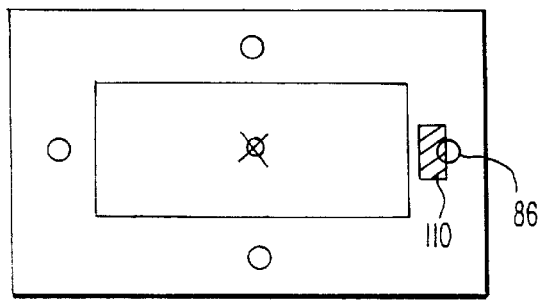

FIG. 11B shows a narrow pattern 110. As was the case in FIG. 11A the CRT is properly aligned and the pattern illuminates only sensor 86. However, unlike FIG. 11A, in FIG. 11B the pattern overlaps only one half of sensor 86. The relative sensor overlap in the wide pattern and narrow pattern cases is key to maintaining alignment of the CRT, and will be discussed in more detail below. First, FIGS. 11C and 11D are referred to in order to show the effect that misalignment has on the test patterns.

Figure 11C:
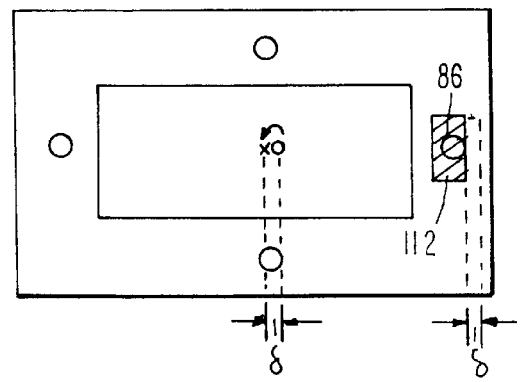
Figure 11D:
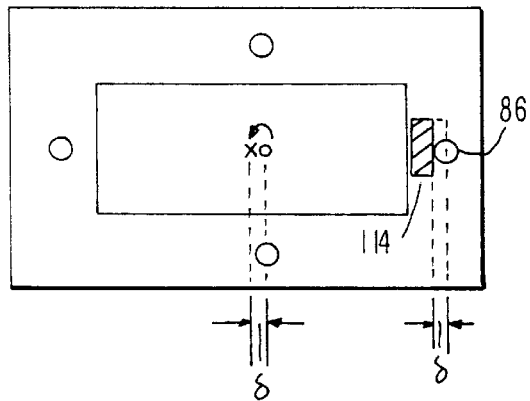

FIG. 11C shows a wide pattern 112 that is generated when the CRT is misaligned by an amount δ in the horizontal direction (left of center from the viewer's perspective). Since the pattern is sufficiently wide, it still overlaps the entirety of sensor 86. FIG. 11D shows a narrow pattern 114 that is generated when the CRT is misaligned by an amount δ in the horizontal direction (left of center from the viewer's perspective). In FIG. 11D, since the pattern is narrow, the sensor overlap is changed relative to the overlap shown in FIG. 11B. As will be described below, this change in overlap is used to determine the amount of misalignment, which is, in turn, used as an error signal for the purpose of correcting the misalignment.

The amount of misalignment is determined by observing the sensor readings as the sensor is exposed to the wide and narrow patterns. The readings obtained are used to form a measured ratio that is compared to a desired ratio, the desired ratio being the ratio obtained for the sensor under no misalignment conditions. The difference between the measured ratio and the desired ratio indicates the amount of beam misalignment at the sensor's location. What follows is a description of an illustrative misalignment determination as performed on the basis of readings taken through sensor 86.

Figure 12A:
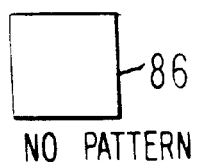
FIG. 12A is a representation of an unilluminated sensor.
Figure 12B:
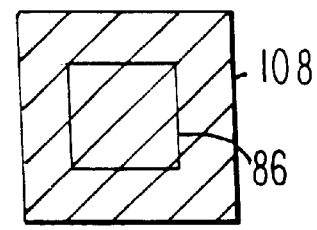
FIGS. 12B–12E are representations of the sensor of FIG. 12A as illuminated by the test patterns of FIGS. 11A–11D, respectively.
Figure 12C:
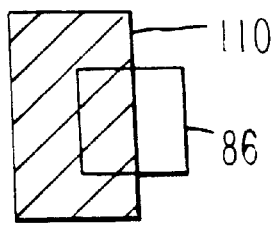
Figure 12D:
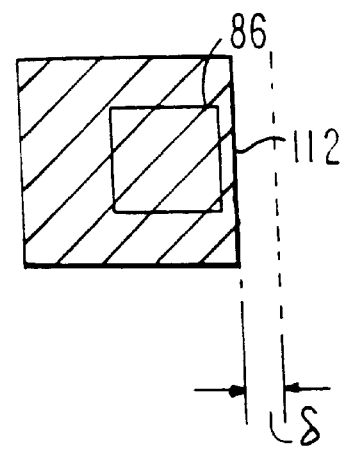
Figure 12E:
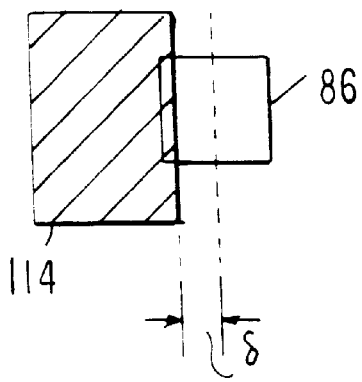

FIGS. 12A–12E show the relationship between sensor 86 and the various test patterns. FIG. 12A depicts the sensor in a no pattern condition. FIGS. 12B–12E show the sensor as illuminated by the patterns of FIGS. 11A–11D, respectively. To measure the misalignment, the light incident on sensor 86 is measured for each of the wide and narrow cases and the ratio of the two measurements is computed. The value of the ratio in the no misalignment case is the desired ratio, and it is a design parameter for the television set. To obtain the desired ratio value: the sensor reading under no pattern conditions (noise) is subtracted from the sensor reading under wide-pattern/no-misalignment conditions (FIG. 12B) to generate a first difference; the sensor reading under no pattern conditions is subtracted from the sensor reading under narrow-pattern/no-misalignment conditions (FIG. 12C) to generate a second difference; and the second difference is divided by the first difference. To obtain the value of the ratio for the depicted misalignment: the sensor reading under no pattern conditions (noise) is subtracted from the sensor reading under wide-pattern/δ-misalignment conditions (FIG. 12D) to generate a first difference; the sensor reading under no pattern conditions is subtracted from the sensor reading under narrow-pattern/δ-misalignment conditions (FIG. 12E) to generate a second difference; and the second difference is divided by the first difference. The difference between the two ratios thus obtained indicates the amount of misalignment. The CRT is then adjusted until the ratios match. A similar procedure is executed for the other primary beams and in this manner convergence about sensor 86 is achieved. Finally, similar procedures may then be executed about the other sensors to complete an overall convergence procedure.

In a second embodiment of the invention convergence testing is undertaken using test patterns similar to those described in co-pending, commonly assigned, U.S. patent application Ser. No. 08/869,126 (Attorney Docket No.: 450103-3882)—entitled "Apparatus and Method for Calibrating Video Displays"—which application is incorporated herein by reference. The patterns used in the present invention, however, differ from the patterns of the Ser. No.: 08/869,126 (Attorney Docket No.: 450103-3882) invention in that the patterns of the present invention illuminate only one sensor at a time.

Exemplary test patterns for performing convergence about sensor 86 according to the second embodiment are shown in FIGS. 13A–13D. For purposes of showing the relative positions of the test patterns, each of FIGS. 13A–13D include the screen 103, the scannable area 106, and the sensors 86, 88, 90 and 92. Also, in each figure, an "o" indicates the center of the screen and an "x" indicates the alignment of the display's CRTs relative to the center of the screen. It should be noted although the patterns depicted in the figures are generated by one of the system's CRTs, all of the system's CRTs are capable of generating such patterns and the discussion concerning the patterns applies to all the CRTs in the system.

Figure 13A:
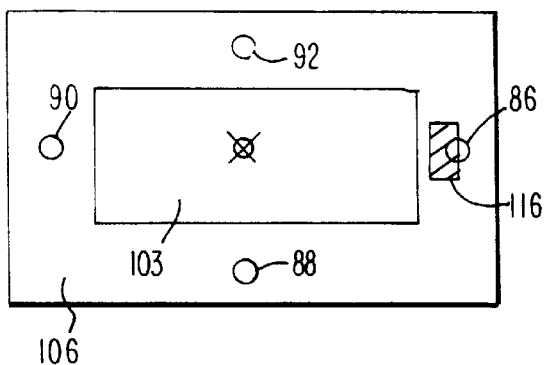
FIGS. 13A–13D show exemplary test patterns that may be used to perform convergence calibration according to a second embodiment of the invention.
Figure 13B:
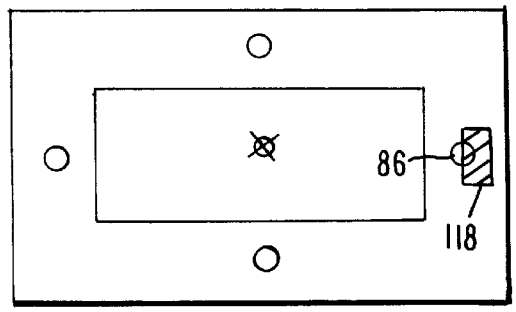

FIGS. 13A and 13B show the test patterns generated by the one of the CRTs when the CRT is properly aligned. FIG. 13A shows a first test pattern 116 which overlaps an inner portion (with respect to screen center) of the sensor, and FIG. 13B shows a second test pattern 118 which overlaps an outer portion of the sensor. The "o" and "x" coincide in FIGS. 13A and 13B since these figures represent the case of proper beam alignment.

Figure 13C:
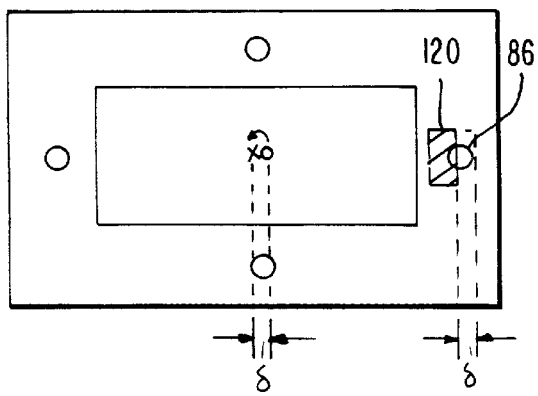
Figure 13D:
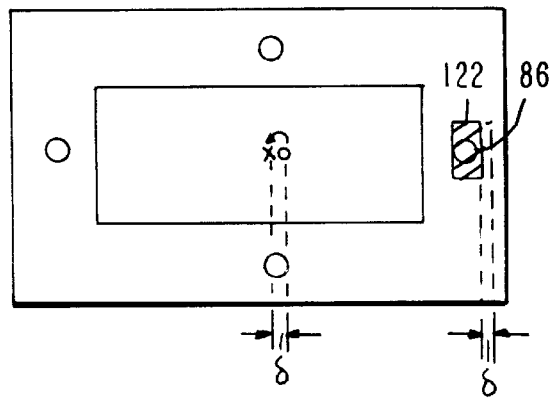

FIGS. 13C and 13D show a shifted first test pattern 120 and a shifted second test pattern 122, respectively. The shifted first pattern is the pattern that results when the CRT is misaligned and attempts to generate the first pattern. The shifted second pattern is the pattern that results when the CRT is misaligned and attempts to generate the second pattern. In both shifted pattern cases, the CRT is misaligned by an amount δ in the horizontal direction (left of center from the viewer's perspective). As can be seen from the figures, the effect of the misalignment on the first pattern is to shift the pattern so that its overlap with the sensor is reduced. Whereas the effect of the misalignment on the second pattern is to shift the pattern so that its overlap with the sensor is increased. As will be described below, the first and second pattern overlap changes resulting from a misalignment are used to determine the amount of the misalignment. The amount of misalignment is, in turn, used as an error signal for the purpose of correcting the misalignment.

The amount of misalignment is determined by observing the sensor readings as the sensor is exposed to the first and second patterns. The readings obtained are used to form a measured ratio that is compared to a desired ratio, the desired ratio being the ratio obtained for the sensor under no misalignment conditions. The difference between the measured ratio and the desired ratio indicates the amount of beam misalignment at the sensor's location. What follows is a description of an illustrative misalignment determination as performed on the basis of readings taken through sensor 86.

Figure 14A:
FIG. 14A is a representation of an unilluminated sensor.
Figure 14B:
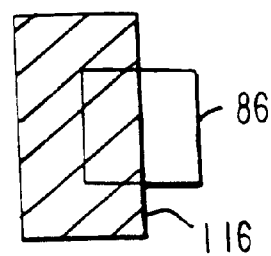
FIGS. 14B–14E are representations of the sensor of FIG. 14A as illuminated by the test patterns of FIGS. 13A–13D, respectively.
Figure 14C:
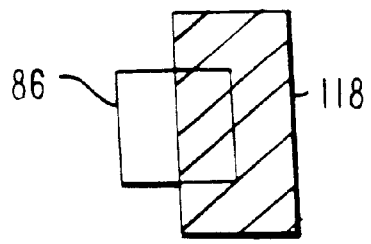
Figure 14D:
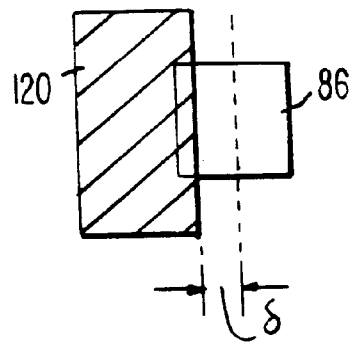
Figure 14E:
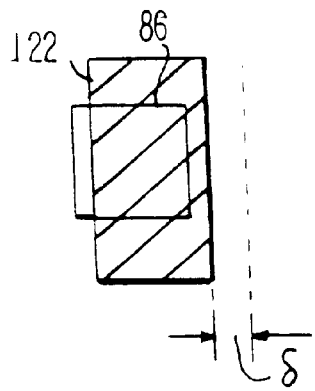

FIGS. 14A–14E show the relationship between sensor 86 and various test patterns. FIG. 14A depicts the sensor in a no pattern condition. FIGS. 14B–14E show the sensor as illuminated by the patterns of FIGS. 13A–13D, respectively. To measure the misalignment, the light incident on the sensor is measured during illumination by the first pattern and during illumination second pattern, and a ratio of the two measurements is computed. The value of the ratio in the no misalignment case is the desired ratio, and it is a design parameter for the television set. To obtain the value of the desired ratio: the sensor reading under no pattern conditions (noise) is subtracted from the sensor reading under first-pattern/no-misalignment conditions (FIG. 14B) to generate a first difference; the sensor reading under no pattern conditions is subtracted from the sensor reading under second-pattern/no-misalignment conditions (FIG. 14C) to generate a second difference; the first difference is added to the second difference to form a sum; and the first difference is divided by the sum. To obtain the value of the ratio for the depicted misalignment: the sensor reading under no pattern conditions (noise) is subtracted from the sensor reading under first-pattern/δ-misalignment conditions (FIG. 14D) to generate a first difference; the sensor reading under no pattern conditions is subtracted from the sensor reading under second-pattern/δ-misalignment conditions (FIG. 14E) to generate a second difference; the first difference is added to the second difference to form a sum; and the first difference is divided by the sum. The difference between the two ratios thus obtained indicates the amount of misalignment. The CRT is then adjusted until the ratios match. A similar procedure is executed for the other primary beams and in this manner convergence about sensor 86 is achieved. Finally, similar procedures may then be executed about the other sensors to complete an overall convergence procedure.

Figure 15:
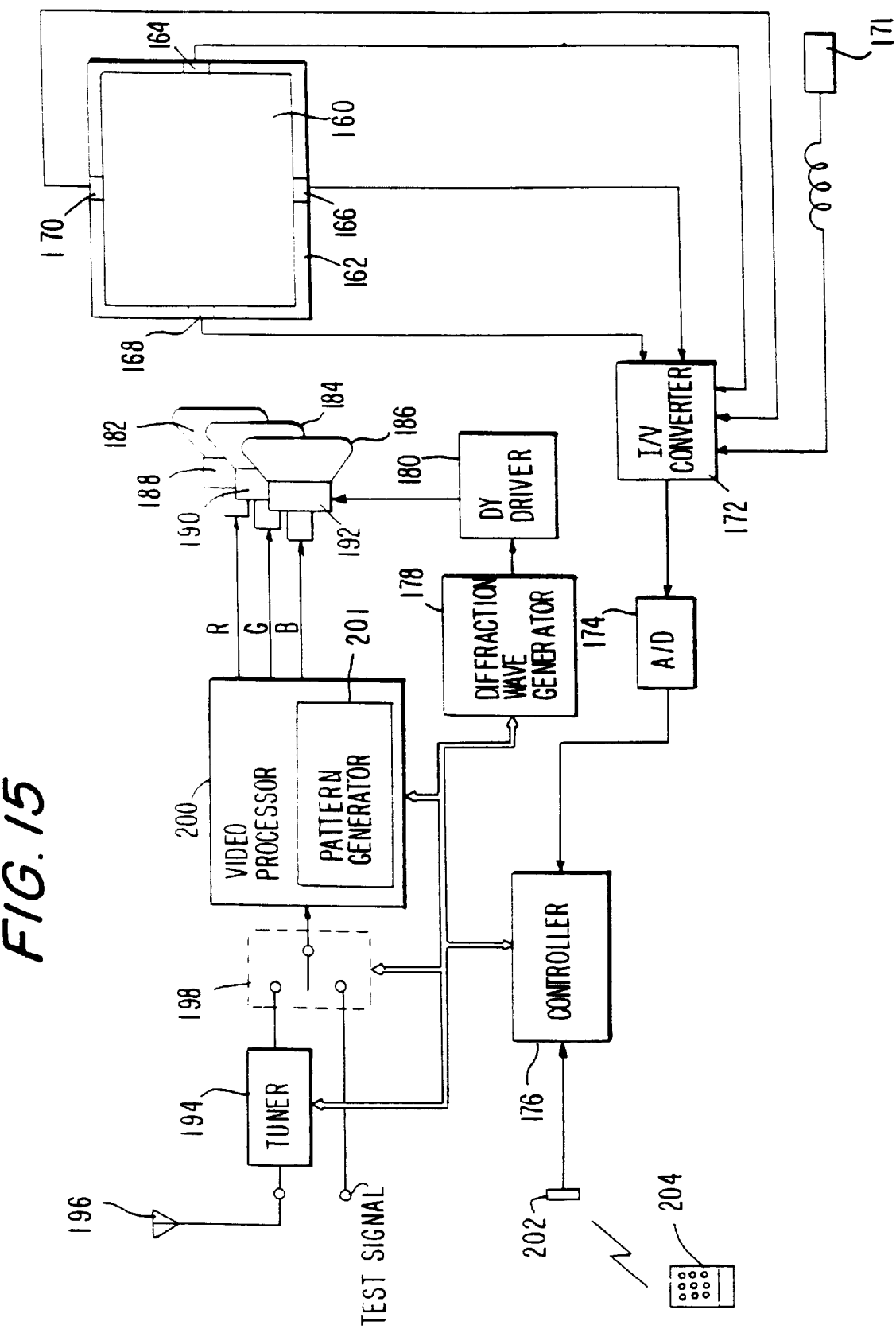
FIG. 15 is a schematic diagram of a television system suitable for implementing the invention.

A schematic diagram of a television system suitable for implementing the present invention is shown in FIG. 15. The system includes a television screen 160 and three CRTs 182, 184 and 186 for forming images on the screen. Each CRT emits a beam of monochromatic light in one of the primary colors (red, blue and green), and each includes a deflection yoke, 188, 190 and 192, respectively. Control of the CRTs for the purpose of forming images on the screen is performed by a video processor 200, which includes a pattern generator 201 for the purpose of forming the convergence test patterns. Convergence adjustment of the CRTs is controlled through a deflection yoke driver 180. Since the invention concerns convergence operations, the convergence portion of the system will be emphasized.

The system includes four peripheral convergence photosensors 164, 166, 168 and 170. The peripheral sensors are located behind a screen frame 162 and are used to perform convergence about positions at the periphery of the screen. As an optional feature, the system includes an external convergence sensor 171. The external sensor is located external to the cabinet and is placed on the outer surface of the screen by the user when the user desires to perform a convergence calibration about a point within the viewable area of the screen. A more detailed description of the external sensor is found in co-pending, commonly assigned, U.S. patent application Ser. No.: 08/868,571 (Attorney Docket No.: 450103-3991)—entitled "Apparatus and Method for Calibrating Video Displays About Points Within the Viewable Area"—which application is incorporated herein by reference.

In any event, the sensors generate analog current signals which are passed to a current to voltage converter 172. The current to voltage regulator converts the current signals to analog voltage signals and relays the voltage signals to an A/D converter 174. The A/D converter receives the analog voltage signals, converts them to digital voltage signals, and passes the digital voltage signals to a controller 176. The controller then uses the digital voltage signals to perform the convergence calculations and determine the amount of any necessary beam alignment corrections. If correction is required, the controller sends appropriate correction signals to a diffraction wave generator 178. The correction signals received by the diffraction wave generator are converted into driver signals which are, in turn, passed to the diffraction yoke driver. The driver then generates one or more deflection yoke control signals and applies them to the CRT deflection yokes. Through repeated beam adjustment by way of the deflection yokes, proper beam alignment is maintained.

In addition to the above-identified elements, the television system of FIG. 15 includes a tuner 194, an antenna 196, a switch 198, and an infrared receiver 202. The tuner is used for receiving television signals, such as broadcast signals, through the antenna. These signals are coupled to the video processor by switch 198. However, the switch may deselect the tuner in favor of a test signal for purposes of testing the system. Infrared receiver 202 is provided to allow for remote control of the system via remote control unit 204.

Figure 16A:
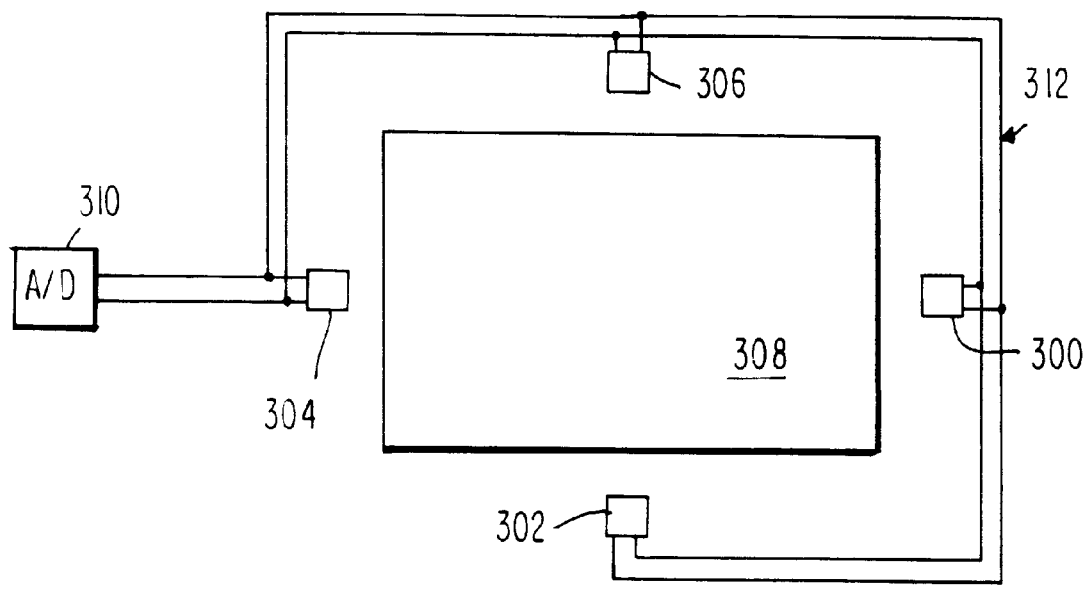
FIGS. 16A and 16B are wiring diagrams showing examples of how a convergence subsystem according to the invention can be wired.
Figure 16B:
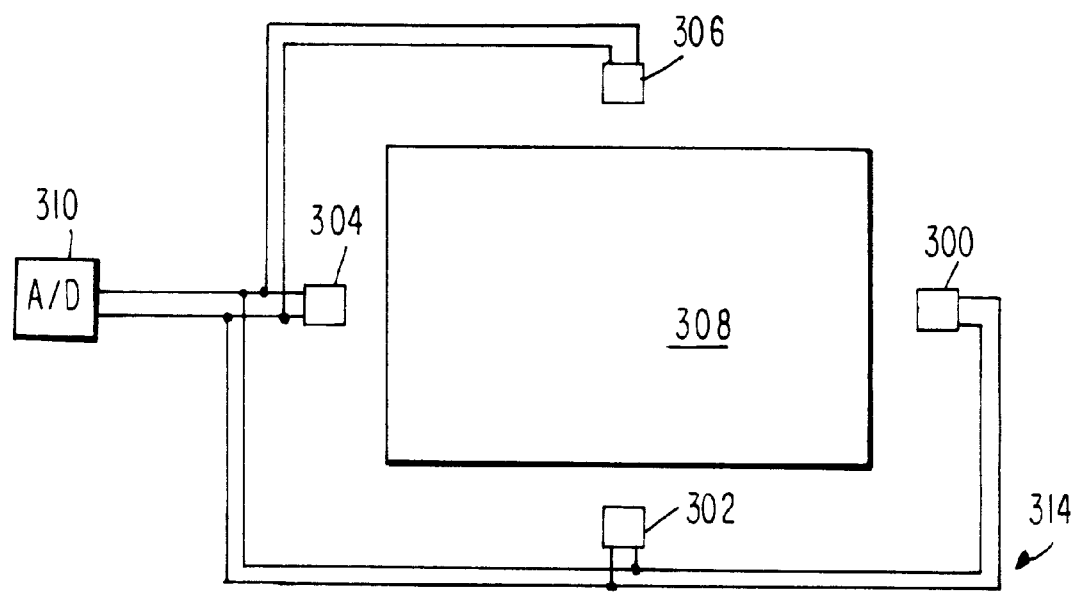

FIGS. 16A and 16B are wiring diagrams that show examples of how a four peripheral sensor system according to the invention can be wired. Both figures depict an arrangement of four sensors, 300, 302, 304 and 306, surrounding a screen 308 and being coupled to an A/D converter 310. In FIG. 16A, the sensors are coupled to the A/D converter through a wiring network 312. In FIG. 16B, the sensors are coupled to the A/D converter through a wiring network 314. The wiring networks perform the same function yet differ in their physical layout.

Figure 17:
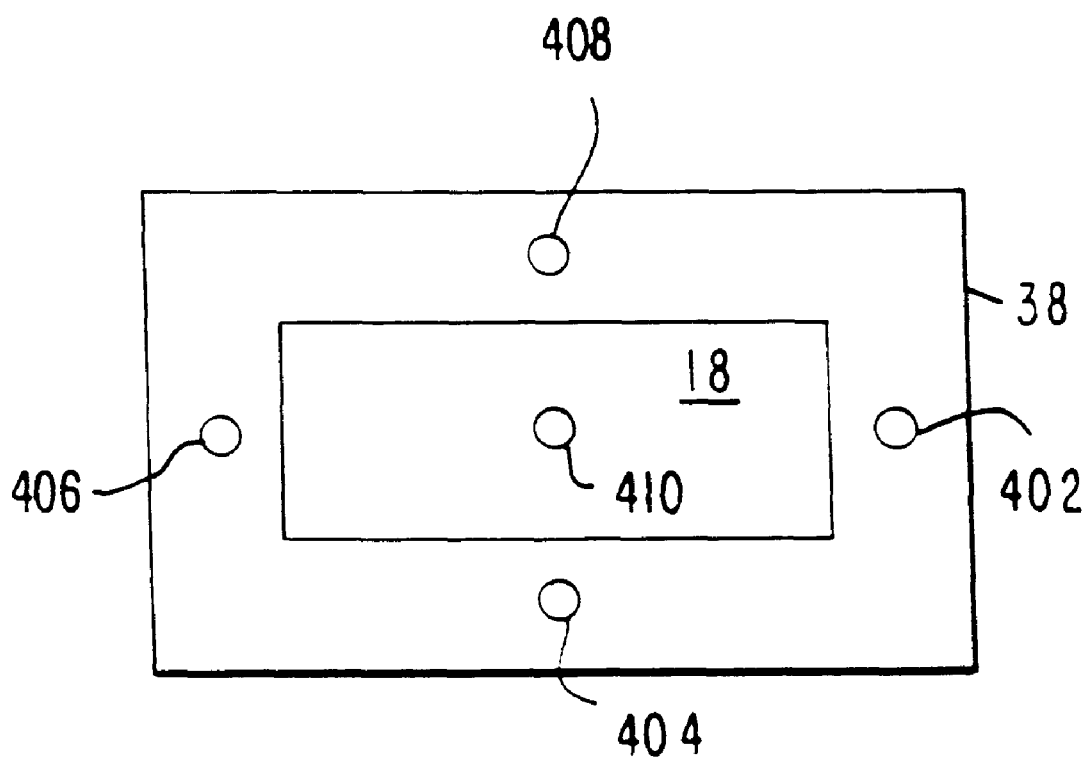
FIG. 17 shows the relationship between sensors, display screen, and scannable area for an alternative sensor arrangement in accordance with the invention.

While the present invention has been particularly shown and described in conjunction with preferred embodiments thereof, it will be readily appreciated by those of ordinary skill in the art that various changes may be made without departing from the spirit and scope of the invention. For example, sensor arrangements other than those described above may be employed. One alternative arrangement is shown in FIG. 17. In the FIG. 17 configuration, five sensors are employed, 402–410, sensor 410 being located at the center of the screen. The sensor arrangement of FIG. 17 may be used in lieu of, or in conjunction with, the external sensor arrangement described above.

Furthermore, the invention is applicable to many types of video displays and is not limited to rear projection television sets. For example, the invention may be employed in computer system monitors.

Therefore, it is intended that the appended claims be interpreted as including the embodiments described herein as well as all equivalents thereto.

We claim:

1. Apparatus for performing convergence calibration in a system that uses multiple beams to generate a video display on a screen, comprising:

a plurality of sensors; and means for generating at least one convergence test pattern for illuminating said sensors one sensor at a time for the purpose of performing beam convergence about the positions of said sensors.

2. The apparatus according to claim 1 wherein the output of said sensors is analog and said apparatus further comprises an analog to digital converter for the purpose of converting said analog sensor outputs to digital sensor outputs.

3. The apparatus according to claim 2, wherein said sensors are coupled directly to the input of said analog to digital converter, without any intervening switching means.

4. The apparatus according to claim 2, wherein said sensors are coupled to a common point which is in turn coupled to the input of said analog to digital converter.

5. The apparatus according to claim 1, wherein said sensors include at least one movable sensor that may be placed at a location within the viewable area of the screen for purposes of convergence calibration, and that may be removed for purposes of normal viewing of the display.

6. The apparatus according to claim 1, wherein said means for generating at least one convergence test pattern comprises:

means for generating a first test pattern that illuminates one of said sensors, said first test pattern being located so as to partially overlap with said illuminated sensor, thereby defining a first covered area for said illuminated sensor, the portion of said illuminated sensor that is not overlapped defining a first uncovered area;

means for generating a second test pattern that illuminates said illuminated sensor a second time, said second test pattern being located so as to overlap with said first uncovered area of said illuminated sensor, the portion of said illuminated sensor that is not overlapped being said first covered area;

wherein for each beam, a first output is generated by said illuminated sensor when said first test pattern is generated, and a second output is generated by said illuminated sensor when said second test pattern is generated; and means for determining alignment of said beams on the basis of said first output and said second output.

7. The apparatus according to claim 6, wherein when no test pattern is generated a no pattern output is generated by said illuminated sensor, and wherein alignment of said beams is determined on the basis of said first output, said second output, and said no pattern output.

8. Apparatus for performing convergence calibration in a system that uses multiple beams to generate a video display on a screen, comprising:

a plurality of sensors;

means for generating at least one convergence test pattern for illuminating said sensors one sensor at a time for the purpose of performing beam convergence about the positions of said sensors, said means for generating at least one convergence test pattern including means for generating a first test pattern that illuminates one of said sensors, said first test pattern being located so as to partially overlap with said illuminated sensor, thereby defining a first covered area for said illuminated sensor, the portion of said illuminated sensor that is not overlapped defining a first uncovered area; means for generating a second test pattern that illuminates said illuminated sensor a second time, said second test pattern being located so as to overlap with said first uncovered area of said illuminated sensor, the portion of said illuminated sensor that is not overlapped being said first covered area; wherein for each beam, a first output is generated by said illuminated sensor when said first test pattern is generated, and a second output is generated by said illuminated sensor when said second test pattern is generated; and means for determining alignment of said beams on the basis of said first output and said second outputs.

9. The apparatus according to claim 8, wherein when no test pattern is generated a no pattern output is generated by said illuminated sensor, and wherein alignment of said beams is determined on the basis of said first output, said second output, and said no pattern output.

* * * * *